United States Patent
Goto et al.

(10) Patent No.: US 11,046,797 B2
(45) Date of Patent: *Jun. 29, 2021

(54) BINDER COMPOSITION FOR ELECTROCHEMICAL DEVICE ELECTRODE, SLURRY COMPOSITION FOR ELECTROCHEMICAL DEVICE ELECTRODE, ELECTROCHEMICAL DEVICE ELECTRODE, AND ELECTROCHEMICAL DEVICE

(71) Applicant: ZEON CORPORATION, Chiyoda-ku Tokyo (JP)

(72) Inventors: Kunihiro Goto, Tokyo (JP); Maki Mesuda, Tokyo (JP); Koji Annaka, Tokyo (JP); Takuya Ishii, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 93 days.

This patent is subject to a terminal disclaimer.

(21) Appl. No.: 16/082,677

(22) PCT Filed: Mar. 24, 2017

(86) PCT No.: PCT/JP2017/012175
§ 371 (c)(1),
(2) Date: Sep. 6, 2018

(87) PCT Pub. No.: WO2017/170281
PCT Pub. Date: Oct. 5, 2017

(65) Prior Publication Data
US 2019/0085109 A1 Mar. 21, 2019

(30) Foreign Application Priority Data

Mar. 28, 2016 (JP) .................................. 2016-064559

(51) Int. Cl.
| | | |
|---|---|---|
| H01M 4/13 | (2010.01) |
| H01M 4/62 | (2006.01) |
| C08F 220/48 | (2006.01) |
| H01G 11/38 | (2013.01) |
| C08F 220/44 | (2006.01) |
| H01M 4/139 | (2010.01) |
| C08F 220/46 | (2006.01) |
| H01G 11/30 | (2013.01) |
| H01M 10/0525 | (2010.01) |

(52) U.S. Cl.
CPC .......... *C08F 220/48* (2013.01); *C08F 220/44* (2013.01); *C08F 220/46* (2013.01); *H01G 11/30* (2013.01); *H01G 11/38* (2013.01); *H01M 4/13* (2013.01); *H01M 4/139* (2013.01); *H01M 4/62* (2013.01); *H01M 4/622* (2013.01); *H01M 10/0525* (2013.01); *C08F 2800/10* (2013.01)

(58) Field of Classification Search
CPC ............... H01M 4/622; H01M 4/0404; H01M 10/0525; H01M 4/621; H01M 4/13; C08F 220/42; C08F 220/44; C08F 220/48; C08F 2800/10; C08J 2333/20; C08J 2333/18

See application file for complete search history.

(56) References Cited

U.S. PATENT DOCUMENTS

| | | | |
|---|---|---|---|
| 2012/0183848 A1* | 7/2012 | Kang | .................... H01M 4/622 429/211 |
| 2013/0280606 A1 | 10/2013 | Sekine et al. | |
| 2013/0330622 A1 | 12/2013 | Sasaki et al. | |

FOREIGN PATENT DOCUMENTS

| | | |
|---|---|---|
| CN | 103421141 A * | 12/2013 |
| EP | 3457477 A1 | 3/2019 |
| EP | 3518327 A1 | 7/2019 |
| JP | 2012204303 A | 10/2012 |
| JP | 5573966 B2 | 8/2014 |
| JP | 2015128069 A | 7/2015 |
| KR | 1020110098111 A | 9/2011 |
| WO | 2012115096 A1 | 8/2012 |

OTHER PUBLICATIONS

CN103421141 machine translation.*
High polar polyacrylonitrile as a potential binder for negative electrodes in lithium ion batteries, L. Gong et al. / Electrochemistry Communications 29 (2013) 45-47.*
Oct. 29, 2019, the Extended European Search Report issued by the European Patent Office in the corresponding European Patent Application No. 17774818.3.
Oct. 2, 2018, International Preliminary Report on Patentability issued in the International Patent Application No. PCT/JP2017/012175.

* cited by examiner

*Primary Examiner* — Haidung D Nguyen
(74) *Attorney, Agent, or Firm* — Kenja IP Law PC

(57) ABSTRACT

A disclosed binder composition comprises a copolymer which comprises a nitrile group-containing monomer unit, an acidic group-containing monomer unit and a basic group-containing monomer unit, wherein the proportion of the nitrile group-containing monomer unit in the copolymer is 70.0 mol % or more and 99.0 mol % or less, and wherein the total proportion of the acidic group-containing monomer unit and the basic group-containing monomer unit in the copolymer is 0.8 mol % or more and 10.0 mol % or less.

5 Claims, No Drawings

BINDER COMPOSITION FOR ELECTROCHEMICAL DEVICE ELECTRODE, SLURRY COMPOSITION FOR ELECTROCHEMICAL DEVICE ELECTRODE, ELECTROCHEMICAL DEVICE ELECTRODE, AND ELECTROCHEMICAL DEVICE

TECHNICAL FIELD

The present disclosure relates to binder compositions for electrochemical device electrode, slurry compositions for electrochemical device electrode, electrochemical device electrodes, and electrochemical devices.

BACKGROUND

Electrochemical devices such as lithium ion secondary batteries and electric double-layer capacitors are small and light, high in energy density, and capable of repeated cycles of charge and discharge. For such characteristics, electrochemical devices are used in a wide variety of applications.

An electrode for a lithium ion secondary battery, for example, normally includes a current collector and an electrode mixed material layer (positive or negative electrode mixed layer) formed on the current collector. The electrode mixed material layer is formed for example by applying on the current collector a slurry composition which comprises an electrode active material, a binder-containing binder composition and other components, and drying the slurry composition applied.

Recently, attempts have been made to improve binder compositions used for forming electrode mixed material layers to enhance the performance of electrochemical devices.

For example, PTL 1 aims to increase adhesion between the electrode active material and the current collector by using as a binder a binder composition which comprises: a copolymer consisting of a structural unit derived from a nitrile group-containing monomer, a structural unit derived from an acidic functional group-containing monomer and a structural unit derived from a specific monomer having an ester bond; and a basic compound capable of neutralizing the acidic functional group, while allowing water to be used as solvent for the preparation of a slurry composition.

Also, for example, PTL 2 aims to improve cycle characteristics of a non-aqueous electrolyte battery by using as a binder a copolymer which comprises specific proportions of a repeat unit derived from a nitrile group-containing monomer and a repeat unit derived from an ethylenically unsaturated compound and which has specific ranges of weight-average molecular weight and molecular weight distribution.

CITATION LIST

Patent Literature

PTL 1: JP2015128069A
PTL 2: JP5573966B

SUMMARY

Technical Problem

Particularly recently, electrochemical devices are required to maintain a high discharge capacity even when subjected to repeated cycles of charge and discharge at high voltage. However, an electrochemical device that includes an electrode formed using the conventional binder compositions described above has the problem of significant reductions in discharge capacity when repeatedly charged and discharged at high voltage. That is, there remains room to improve the conventional binder compositions in terms of allowing electrochemical devices to exert superior high-voltage cycle characteristics.

An object of the present disclosure is therefore to provide a binder composition and a slurry composition for electrochemical device electrode which can be used to form an electrode mixed material layer that allows an electrochemical device to exert superior high-voltage cycle characteristics.

Another object of the present disclosure is to provide an electrochemical device electrode which allows an electrochemical device to exert superior high-voltage cycle characteristics.

Still another object of the present disclosure is to provide an electrochemical device having superior high-voltage cycle characteristics.

Solution to Problem

The inventor conducted intensive studies for the purpose of solving the foregoing problem. The inventor discovered that the use of a binder composition which comprises a copolymer which comprises a specific proportion of a nitrile group-containing monomer unit and further both an acidic group-containing monomer unit and a basic group-containing monomer unit wherein the total proportion of the latter two monomer units falls within a specific range makes it possible to form an electrode mixed material layer which can improve high-voltage cycle characteristics of an electrochemical device.

Specifically, the present disclosure aims to advantageously solve the foregoing problem and the binder composition for electrochemical device electrode of the present disclosure is a binder composition for electrochemical device electrode which comprises a copolymer, wherein the copolymer comprises a nitrile group-containing monomer unit, an acidic group-containing monomer unit and a basic group-containing monomer unit, wherein the proportion of the nitrile group-containing monomer unit in the copolymer is 70.0 mol % or more and 99.0 mol % or less, and wherein the total proportion of the acidic group-containing monomer unit and the basic group-containing monomer unit in the copolymer is 0.8 mol % or more and 10.0 mol % or less. With the binder composition which comprises a copolymer having the composition described above, it is possible to form an electrode mixed material layer which allows an electrochemical device to exert superior high-voltage cycle characteristics.

By the phrase "comprise a monomer unit" as used herein is meant that "a repeat unit derived from a monomer is contained in a polymer obtained using that monomer." Herein, in a polymer produced by copolymerization of two or more different monomers, "the proportion of a monomer unit" formed by polymerization of a certain monomer is generally consistent with the proportion (charging ratio) of that polymer in the total monomers used for polymerization of the polymer. The proportion of each monomer unit in a polymer can be measured by nuclear magnetic resonance (NMR) spectroscopy such as $^1$H-NMR or $^{13}$C-NMR.

It is preferred in the binder composition for electrochemical device electrode of the present disclosure that the copolymer further comprises a monofunctional ethylenically unsaturated carboxylic acid ester monomer unit wherein the proportion of the monofunctional ethylenically unsaturated carboxylic acid ester monomer unit in the copolymer is 0.2 mol % or more and 20.0 mol % or less. When the copolymer comprises such a proportion of a monofunctional ethylenically unsaturated carboxylic acid ester monomer unit, it gives appropriate flexibility to the electrode as well as increases peel strength of the electrode (adhesion strength between the electrode mixed material layer and the current collector). It is then possible to suppress cell bulging after repeated cycles of charge and discharge while further improving high-voltage cycle characteristics of an electrochemical device.

It is also preferred in the binder composition for electrochemical device electrode of the present disclosure that the basic group-containing monomer unit is at least one of an amino group-containing monomer unit and an amide group-containing monomer unit. When a copolymer that comprises either one of these basic group-containing monomer units is used, it is possible to increase peel strength of the electrode. It is also possible to suppress cell bulging after repeated cycles of charge and discharge while further improving high-voltage cycle characteristics of the electrochemical device.

It is also preferred in the binder composition for electrochemical device electrode of the present disclosure that the acidic group-containing monomer unit in the copolymer is at least one monomer unit selected from the group consisting of a carboxylic acid group-containing monomer unit, a sulfonate group-containing monomer unit, and a phosphate group-containing monomer unit. When a copolymer that comprises either one of these acidic group-containing monomer units is used, it is possible to increase peel strength of the electrode. It is also possible to suppress cell bulging after repeated cycles of charge and discharge while further improving high-voltage cycle characteristics of the electrochemical device.

It is also preferred in the binder composition for electrochemical device electrode of the present disclosure that the ratio of the proportion of the basic group-containing monomer unit to the proportion of the acidic group-containing monomer unit is 0.1 or more and 2.0 or less. When the acidic group-containing monomer unit and the basic group-containing monomer unit are contained in the above molar ratio, it is possible to increase peel strength of the electrode. It is also possible to suppress cell bulging after repeated cycles of charge and discharge while further improving high-voltage cycle characteristics of the electrochemical device.

The present disclosure aims to advantageously solve the foregoing problem and the slurry composition for electrochemical device electrode of the present disclosure comprises any of the binder compositions for electrochemical device electrode described above, and an electrode active material. When any of the binder compositions for electrochemical device electrode described above is used, it is possible to obtain a slurry composition for electrochemical device electrode which can be used to form an electrode mixed material layer that allows an electrochemical device to exert superior high-voltage cycle characteristics.

The present disclosure aims to advantageously solve the foregoing problem and the electrochemical device electrode of the present disclosure comprises an electrode mixed material layer formed using the slurry composition for electrochemical device electrode described above. When the slurry composition for electrochemical device electrode described above is used, it is possible to obtain an electrochemical device electrode which allows an electrochemical device to exert superior high-voltage cycle characteristics.

The present disclosure aims to advantageously solve the foregoing problem and the electrochemical device of the present disclosure comprises the electrochemical device electrode described above. When the electrochemical device electrode described above is used, it is possible to obtain an electrochemical device having superior characteristics such as high-voltage cycle characteristics.

Advantageous Effect

According to the present disclosure, it is possible to provide a binder composition and a slurry composition for electrochemical device electrode which can be used to form an electrode mixed material layer that allows an electrochemical device to exert superior high-voltage cycle characteristics.

According to the present disclosure, it is also possible to provide an electrochemical device electrode which allows an electrochemical device to exert superior high-voltage cycle characteristics.

According to the present disclosure, it is also possible to provide an electrochemical device having superior high-voltage cycle characteristics.

DETAILED DESCRIPTION

Embodiments of the present disclosure will now be described in detail.

The binder composition for electrochemical device electrode of the present disclosure can be used for preparing a slurry composition for electrochemical device electrode. The slurry composition for electrochemical device electrode prepared by using the binder composition for electrochemical device electrode of the present disclosure can then be used for manufacturing an electrode of an electrochemical device such as a lithium ion secondary battery. Further, the electrochemical device of the present disclosure comprises the electrochemical device electrode of the present disclosure formed using the slurry composition for electrochemical device electrode of the present disclosure.

(Binder Composition for Electrochemical Device Electrode)

The binder composition for electrochemical device electrode of the present disclosure comprises a copolymer, and optically solvent and other components which may be blended in an electrochemical device electrode. The copolymer in the binder composition of the present disclosure comprises 70.0 mol % or more and 99.0 mol % or less of a nitrile group-containing monomer unit and both an acidic group-containing monomer unit and a basic group-containing monomer unit, wherein the total proportion of the acidic group-containing monomer unit and the basic group-containing monomer unit is 0.8 mol % or more and 10.0 mol % or less.

It should be noted that the binder composition for electrochemical device electrode of the present disclosure may be a substantially solvent-free powder composition consisting of a plurality of particles which comprise the copolymer.

Because the binder composition of the present disclosure comprises the copolymer described above as a binder, when a slurry composition which comprises the binder composition is used, it is possible to form an electrode mixed layer material that allows an electrochemical device to exert superior high-voltage cycle characteristics.

The reason why the binder composition of the present disclosure can improve high-voltage cycle characteristics of an electrochemical device is uncertain, but it is presumed that high-voltage cycle characteristics are improved for the reason as discussed below. Specifically, the copolymer contained in the binder composition of the present disclosure comprises 70.0 mol % or more and 99.0 mol % or less of a nitrile group-containing monomer unit which may well interact with the surface of electrode active material while imparting oxidization resistance to the copolymer. Hence, the copolymer can keep well covering the electrode active material even after repeated cycles of charge and discharge. In addition, the copolymer comprises both an acidic group-containing monomer unit and a basic group-containing monomer unit such that the total proportion of the acidic group-containing monomer unit and the basic group-containing monomer unit is 0.8 mol % or more and 10.0 mol % or less. While the copolymer well interacts with the electrode active material through acidic groups and basic groups (particularly through acidic groups), the acidic group and basic group interact with each other by ionic or other bonding between polymer chains of the copolymer to thereby improve polymer strength. Thus, the copolymer can better cover the electrode active material as well as can stably retain its adhesion property even after repeated cycles of charge and discharge. With the contribution of the nitrile group-containing monomer unit combined with the contribution of the acidic group-containing monomer unit and the basic group-containing monomer unit, an electrode mixed material layer which comprises the copolymer allows an electrochemical device to exhibit superior high-voltage cycle characteristics.

<Copolymer>

In an electrode manufactured by forming an electrode mixed material layer formed using a slurry composition prepared from the binder composition, the copolymer retains components included in the electrode mixed material layer so that they are not released from the electrode mixed material layer (i.e., the copolymer functions as a binder).

[Composition of Copolymer]

The copolymer comprises a nitrile group-containing monomer unit, an acidic group-containing monomer unit and a basic group-containing monomer unit, and optionally comprises other monomer unit(s). Any monomer unit can be used as monomer units other than the nitrile group-containing monomer unit, the acidic group-containing monomer unit and the basic group-containing monomer unit. Examples of other monomer units include a monofunctional ethylenically unsaturated carboxylic acid ester monomer unit, a conjugated diene monomer unit, and an aromatic vinyl monomer unit.

—Nitrile Group-Containing Monomer Unit—

Examples of nitrile group-containing monomers which may form the nitrile group-containing monomer unit include α,β-ethylenically unsaturated nitrile monomers. Specifically, any α,β-ethylenically unsaturated compound having a nitrile group can be used and examples include acrylonitrile; α-halogenoacrylonitrile such as α-chloroacrylonitrile and α-bromoacrylonitrile; and α-alkylacrylonitrile such as methacrylonitrile and α-ethylacrylonitrile. Preferred are acrylonitrile and methacrylonitrile. These nitrile group-containing monomers can be used alone or in combination.

The proportion of the nitrile group-containing monomer unit in the copolymer needs to be 70.0 mol % or more and 99.0 mol % or less of the total (100 mol %) of all repeat units of the copolymer, preferably 75.0 mol % or more, more preferably 80.0 mol % or more, even more preferably 85.0 mol % or more, particularly preferably 90.0 mol % or more, and most preferably 91.0 mol % or more, but preferably 98.0 mol % or less, and more preferably 97.0 mol % or less. When the proportion of the nitrile group-containing monomer unit in the copolymer exceeds the upper limit value of the range described above, the flexibility of the electrode is impaired, so that the electrode is susceptible to crack due to expansion or shrinkage of the electrode active material associated with repeated cycles of charge and discharge. On the other hand, when the proportion of the nitrile group-containing monomer unit in the copolymer is below the lower limit value of the range described above, the oxidization resistance of the copolymer decreases and the copolymer cannot cover the electrode active material well. That is, when the proportion of the nitrile group-containing monomer unit in the copolymer falls within the range above-described, it is possible to cover the electrode active material well by the copolymer having superior oxidization resistance and to ensure electrode flexibility, so that high-voltage cycle characteristics of an electrochemical device can be improved. With the electrode active material being well covered by the copolymer, gas generation due to decomposition of the electrolyte solution at the surface of the electrode active material can be prevented to suppress cell bulging after repeated cycles of charge and discharge. Further, it is possible to reduce internal resistance of an electrochemical device.

—Acidic Group-Containing Monomer Unit—

Examples of acidic group-containing monomers which may form the acidic group-containing monomer unit include carboxylic acid group-containing monomers, sulfonate group-containing monomers, and phosphate group-containing monomers. When these monomers are used as acidic group-containing monomers, the peel strength of the electrode can be increased. In addition, it is possible to further improve high-voltage cycle characteristics of an electrochemical device and suppress cell bulging after repeated cycles of charge and discharge. The acidic group-containing monomers may be in the form of salt such as sodium salt or lithium salt.

Examples of carboxylic acid group-containing monomers include monocarboxylic acids and derivatives thereof, dicarboxylic acids and acid anhydrides thereof, and derivatives thereof.

Examples of monocarboxylic acids include acrylic acid, methacrylic acid, and crotonic acid.

Examples of monocarboxylic acid derivatives include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of dicarboxylic acid derivatives include methyl maleic acid, dimethyl maleic acid, phenyl maleic acid, chloromaleic acid, dichloromaleic acid, and fluoromaleic acid; and maleic acid monoesters such as nonyl maleate, decyl maleate, dodecyl maleate, octadecyl maleate, and fluoroalkyl maleate.

Examples of acid anhydrides of dicarboxylic acids include maleic anhydride, acrylic anhydride, methyl maleic anhydride, and dimethyl maleic anhydride.

Also usable as carboxylic acid group-containing monomers are acid anhydrides which produce a carboxyl group by hydrolysis.

Examples of sulfonate group-containing monomers include styrenesulfonic acid, vinylsulfonic acid, methylvinylsulfonic acid, (meth)allylsulfonic acid, and 3-allyloxy-2-hydroxypropanesulfonic acid.

By "(meth)allyl" as used herein is meant allyl and/or methallyl.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

By "(meth)acryloyl" as used herein is meant acryloyl and/or methacryloyl.

Preferred acidic group-containing monomers are carboxylic acid group-containing monomers from the perspective of improving the polymerization stability when preparing the copolymer and peel strength of the electrode, with (meth)acrylic acid being more preferred and methacrylic acid being even more preferred. That is, the acidic group-containing monomer unit is preferably a carboxylic acid group-containing monomer unit, more preferably a (meth)acrylic acid unit, and even more preferably a methacrylic acid unit. By "(meth)acryl" as used herein is meant acryl and/or methacryl. The acidic group-containing monomers may be used alone or in combination at any ratio.

The proportion of the acidic group-containing monomer unit in the copolymer is preferably 0.3 mol % or more of the total (100 mol %) of all repeat units of the copolymer, more preferably 0.5 mol % or more, and even more preferably 1.0 mol % or more, but preferably 8.0 mol % or less, more preferably 6.0 mol % or less, even more preferably 5.0 mol % or less, and particularly preferably 3.0 mol % or less. When the proportion of the acidic group-containing monomer unit in the copolymer is not greater than the upper limit value described above, a copolymer which ensures a sufficient proportion of the nitrile group-containing monomer unit in the copolymer can well cover the electrode active material. When the proportion of the acidic group-containing monomer unit in the copolymer is not less than the lower limit value described above, it is possible to increase peel strength of the electrode. Thus, when the proportion of the acidic group-containing monomer unit in the copolymer falls within the range described above, it is possible to further improve high-voltage cycle characteristics of an electrochemical device and suppress cell bulging after repeated cycles of charge and discharge.

—Basic Group-Containing Monomer Unit—

Examples of basic group-containing monomers which may form the basic group-containing monomer unit include monomers having a nitrogen-containing functional group, such as amino group-containing monomers and amide group-containing monomers (with the proviso that the nitrile group-containing monomers described above are excluded). When these monomers are used as basic group-containing monomers, it is possible to increase peel strength of the electrode. In addition, it is possible to further improve high-voltage cycle characteristics of an electrochemical device and suppress cell bulging after repeated cycles of charge and discharge. The basic group-containing monomer may be in the form of salt containing chloride ion or the like.

Examples of amino group-containing monomers include dimethylaminoethyl (meth)acrylate, diethylaminoethyl (meth)acrylate, aminoethyl vinyl ether, and dimethylaminoethyl vinyl ether. By "(meth)acrylate" as used herein is meant acrylate and/or methacrylate.

Examples of amide group-containing monomers include N-vinylacetamide, (meth)acrylamide, N-methylol (meth)acrylamide, dimethyl (meth)acrylamide, hydroxyethyl (meth)acrylamide, N-methoxymethyl (meth)acrylamide, and dimethylaminopropyl (meth)acrylamide.

Preferred basic group-containing monomers are dimethylaminoethyl methacrylate, diethylamino methacrylate and acrylamide from the perspective of increasing peel strength of the electrode.

The basic group-containing monomers may be used alone or in combination at any ratio.

The proportion of the basic group-containing monomer unit in the copolymer is preferably 0.1 mol % or more of the total (100 mol %) of all repeat units of the copolymer, more preferably 0.3 mol % or more, and even more preferably 0.5 mol % or more, but preferably 4.0 mol % or less, more preferably 3.0 mol % or less, even more preferably 2.0 mol % or less, and particularly preferably 1.0 mol % or less. When the proportion of the basic group-containing monomer unit in the copolymer is not greater than the upper limit value described above, a copolymer which ensures a sufficient proportion of the nitrile group-containing monomer unit in the copolymer can well cover the electrode active material. When the proportion of the basic group-containing monomer unit in the copolymer is not less than the lower limit value described above, it is possible to increase peel strength of the electrode with polymer chains of the copolymer better interacting with one another through basic groups and acidic groups. Thus, when the proportion of the basic group-containing monomer unit in the copolymer falls within the range described above, it is possible to further improve high-voltage cycle characteristics of an electrochemical device and suppress cell bulging after repeated cycles of charge and discharge.

—Total Proportion of Acidic Group-Containing Monomer Unit and Basic Group-Containing Monomer Unit—

The total proportion of the acidic group-containing monomer unit and the basic group-containing monomer unit in the copolymer needs to be 0.8 mol % or more and 10.0 mol % or less of the total (100 mol %) of all repeat units of the copolymer, preferably 1.0 mol % or more, and more preferably 1.7 mol % or more, but preferably 7.0 mol % or less, more preferably 5.0 mol % or less, and even more preferably 3.0 mol % or less. When the total proportion of the two monomer units exceeds the upper limit value described above, it is not possible to ensure a sufficient proportion of the nitrile group-containing monomer unit and hence the copolymer cannot well cover the electrode active material. On the other hand, when the total proportion of the two monomer units is below the lower limit value described above, it is not possible to ensure peel strength of the electrode. That is, when the total proportion of the two monomer units in the copolymer falls within the range described above, it is possible to well cover the electrode active material by the copolymer and to ensure peel strength of the electrode, so that high-voltage cycle characteristics of an electrochemical device can be improved. With the electrode active material being well covered by the copolymer, gas generation due to decomposition of the electrolyte solution at the surface of the electrode active material can be prevented to suppress cell bulging after repeated cycles of charge and discharge.

—Ratio of the Proportion of Basic Group-Containing Monomer Unit to the Proportion of Acidic Group-Containing Monomer Unit—

The ratio by mole of the proportion of the basic group-containing monomer unit to the proportion of the acidic group-containing monomer unit (hereinafter abbreviated as "basic group/acidic group ratio" in some cases) is preferably 0.1 or more, more preferably 0.2 or more, and even more preferably 0.4 or more, but preferably 2.0 or less, more preferably 1.5 or less, and even more preferably 1.0 or less.

When the basic group/acidic group ratio is not greater than the upper limit described above, a sufficient amount of acidic groups can be ensured with respect to the amount of basic groups. Thus, the acidic groups of polymer chains of the copolymer sufficiently interact with the basic groups of the polymer chains and the copolymer can well adhere to the electrode active material through the acidic groups. When the basic group/acidic group ratio is not less than the lower limit described above, a sufficient amount of basic groups can be ensured with respect to the amount of acidic groups. Thus, the basic groups of polymer chains of the copolymer can sufficiently interact with the acidic groups of the polymer chains. Thus, when the basic group/acidic group ratio falls within the range described above, it is possible to ensure peel strength of the electrode by enhancing interactions among polymer chains. It is also possible to further improve high-voltage cycle characteristics of an electrochemical device and suppress cell bulging after repeated cycles of charge and discharge.

—Monofunctional Ethylenically Unsaturated Carboxylic Acid Ester Monomer Unit—

Monofunctional ethylenically unsaturated carboxylic acid ester monomers which may form the monofunctional ethylenically unsaturated carboxylic acid ester monomer unit are monocarboxylic acid esters having one ethylenically unsaturated bond in the molecule. Examples include alkyl acrylates such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate such as 2-ethylhexyl acrylate, nonyl acrylate, decyl acrylate, lauryl acrylate, n-tetradecyl acrylate, and stearyl acrylate; and alkyl methacrylates such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate such as 2-ethylhexyl methacrylate, nonyl methacrylate, decyl methacrylate, lauryl methacrylate, n-tetradecyl methacrylate, and stearyl methacrylate.

Preferred is n-butyl acrylate from the perspective of improving peel strength of the electrode by imparting flexibility to the electrode while ensuring reactivity and polymerization stability when preparing the copolymer. The monofunctional ethylenically unsaturated carboxylic acid ester monomers may be used alone or in combination at any ratio.

The proportion of the monofunctional ethylenically unsaturated carboxylic acid ester monomer unit in the copolymer is preferably 0.2 mol % or more of the total (100 mol %) of all repeat units of the copolymer, and more preferably 1.0 mol % or more, but preferably 20.0 mol % or less, more preferably 15.0 mol % or less, even more preferably 10.0 mol % or less, and particularly preferably 5.0 mol % or less. When the proportion of the monofunctional ethylenically unsaturated carboxylic acid ester monomer unit in the copolymer is not greater than the upper limit value described above, the copolymer can well cover the electrode active material without being excessively swollen in electrolyte solution. On the other hand, when the proportion of the monofunctional ethylenically unsaturated carboxylic acid ester monomer unit in the copolymer is not less than the lower limit value described above, the electrode flexibility increases and, for example, even when the electrode active material has been expanded or shrunk due to repeated cycles of charge and discharge, cracking of the electrode can be suppressed. Thus, when the proportion of the monofunctional ethylenically unsaturated carboxylic acid ester monomer unit in the copolymer falls within the range described above, it is possible to ensure peel strength of the electrode.

—Conjugated Diene Monomer Unit—

Examples of conjugated diene monomers which may form the conjugated diene monomer unit include aliphatic conjugated diene monomers such as 1,3-butadiene, 2-methyl-1,3-butadiene, 2,3-dimethyl-1,3-butadiene, 2-chloro-1,3-butadiene, substituted linear conjugated pentadienes, and substituted and side chain conjugated hexadienes. These conjugated diene monomers may be used alone or in combination at any ratio.

The proportion of the conjugated diene monomer unit in the copolymer is not particularly limited but is preferably 0.8 mol % or more of the total (100 mol %) of all repeat units of the copolymer, but preferably 10.0 mol % or less.

—Aromatic Vinyl Monomer Unit—

Examples of aromatic vinyl monomers which may form the aromatic vinyl monomer unit include styrene, α-methylstyrene, vinyltoluene, and divinylbenzene. These aromatic vinyl monomers may be used alone or in combination at any ratio. It should be noted that monomers included in the acidic group-containing monomers described above are not included in aromatic vinyl monomers.

The proportion of the aromatic vinyl monomer unit in the copolymer is not particularly limited but is preferably 0.8 mol % or more of the total (100 mol %) of all repeat units of the copolymer, but preferably 10.0 mol % or less.

[Preparation of Copolymer]

The copolymer can be produced for example by polymerizing a monomer composition which comprises the monomers described above in aqueous solvent. The proportion of each monomer in the monomer composition in the present disclosure can be determined in accordance with the proportions of the monomer units (repeat units) in the copolymer.

Any aqueous solvent can be used as long as the copolymer can be dispersed therein, and water alone or a mixed solvent of water and other solvent(s) may be used.

Any polymerization mode can be used, such as, for example, solution polymerization, suspension polymerization method, bulk polymerization or emulsion polymerization. Any polymerization method can be used such as, for example, ionic polymerization, radical polymerization, or living radical polymerization.

For emulsifiers, dispersants, polymerization initiators, polymerization aids and other agents used for polymerization, those commonly used can be used in amounts which are commonly used.

The copolymer obtained as described above can be used for preparing a binder composition as will be described later. That is, the present specification discloses a method of producing a binder composition for electrochemical device electrode, which comprises preparing the copolymer described above. Specifically, the method of producing a binder composition for electrochemical device electrode as disclosed herein comprises preparing a copolymer by polymerizing a monomer composition which comprises the nitrile group-containing monomer, the acidic group-containing monomer and the basic group-containing monomer, wherein the proportion of the nitrile group-containing monomer is 70.0 mol % or more and 99.0 mol % or less of the total (100 mol %) of all monomers in the monomer composition and the total proportion of the acidic group-containing monomer and the basic group-containing monomer is 0.8 mol % or more and 10.0 mol % or less of the total (100 mol %) of all monomers in the monomer composition.

<Solvent>

Any solvent can be used as the solvent which may be contained in the binder composition, with organic solvents being preferred. Examples of organic solvents include alcohols such as methanol, ethanol, n-propanol, isopropanol, n-butanol, isobutanol, t-butanol, pentanol, hexanol, heptanol, octanol, nonanol, decanol and amyl alcohol; ketones such as acetone, methyl ethyl ketone and cyclohexanone; esters such as ethyl acetate and butyl acetate; ethers such as diethyl ether, dioxane, and tetrahydrofuran; amide polar organic solvents such as N,N-dimethylformamide, N,N-dimethylacetamide, and N-methylpyrrolidone (NMP); N,N-dimethyl sulfoxide; and aromatic hydrocarbons such as toluene, xylene, chlorobenzene, orthodichlorobenzene, and paradichlorobenzene. These organic solvents may be used alone or two or more of them may be mixed. Preferred are aprotic polar solvents such as ketones, esters, amide polar organic solvents, and N,N-dimethylsulfoxide, with NMP being particularly preferred.

<Other Components>

The binder composition may comprise, in addition to the components described above, other components such as binders, reinforcing materials, leveling agents, viscosity modifiers and additives for electrolyte solution. Components known in the art can be used, such as those described in WO2012/115096A. Such other components may be used alone or in combination at any ratio. When other components such as binders and reinforcing materials other than the copolymer described above are used, it is preferred that such other components comprise at least one of an acidic group and a basic group for the purpose of enhancing electrode strength by increasing interactions between the polymer chain of the copolymer and other component in the binder composition. Examples of binders having an acidic group and/or a basic group include fluorine-containing polymers such as PVDF, hydrogenated nitrile rubber, or particulate polymers which are insoluble in the solvent of the binder composition and which have an acidic group and/or a basic group.

<Preparation of Binder Composition>

The binder composition of the present disclosure can be prepared by mixing the components described above by methods known in the art. For example, when the copolymer is prepared in the form of aqueous dispersion, the aqueous solvent is replaced with organic solvent by techniques known in the art and other components are added as necessary to prepare a binder composition which comprises an organic solvent as solvent. Alternatively, the binder composition which comprises an organic solvent as solvent can be prepared by removing water from the aqueous dispersion described above to afford a powder composition and dissolving the powder composition into organic solvent (Slurry Composition for Electrochemical Device Electrode)

The slurry composition for electrochemical device electrode of the present disclosure comprises an electrode active material and the binder composition described above, and may further comprise a conductive material and other components. That is, the slurry composition of the present disclosure usually comprises an electrode active material and the copolymer described above in the solvent described above, and optionally further comprises a conductive material and other components. Since the slurry composition of the present disclosure comprises the binder composition described above, the electrode mixed material layer formed using the slurry composition allows an electrochemical device to exert excellent high-voltage cycle characteristics.

<Electrode Active Material>

The electrode active material refers to a material which transfers and receives electrons in an electrode of an electrochemical device. When the electrochemical device is, for example, a lithium ion secondary battery, as the electrode active material, a material which may store and release lithium is usually used.

The following describes a case where the slurry composition is for a lithium ion secondary battery electrode by way of example, but the present disclosure is not limited to this particular example.

Any positive electrode active material for lithium ion secondary batteries can be used and examples include those known in the art, such as lithium-containing cobalt oxide ($LiCoO_2$), lithium manganese oxide ($LiMn_2O_4$), lithium-containing nickel oxide ($LiNiO_2$), lithium-containing composite oxide of Co—Ni—Mn($Li(CoMnNi)O_2$), lithium-containing composite oxide of Ni—Mn—Al, lithium-containing composite oxide of Ni—Co—Al, olivine type lithium iron phosphate ($LiFePO_4$), olivine type lithium manganese phosphate ($LiMnPO_4$), $Li_2MnO_3$—$LiNiO_2$-based solid solution, lithium-rich spinel compound represented by the formula $Li_{1+x}Mn_{2-x}O_4$ (0<X<2), $Li[Ni_{0.17}Li_{0.2}Co_{0.07}Mn_{0.56}]O_2$, and $LiNi_{0.5}Mn_{1.5}O_4$.

The blending amount or particle size of the positive electrode active material used herein may be, but not limited to, the same amount or particle size as the positive electrode active material conventionally used.

Examples of negative electrode active materials for lithium ion secondary batteries include carbon-based negative electrode active materials, metal-based negative electrode active materials, and combinations thereof.

The carbon-based negative electrode active material refers to an active material which contains carbon in its main backbone and to which lithium can be intercalated (or doped). Examples of carbon-based negative electrode active materials include carbonaceous materials and graphitic materials.

Examples of carbonaceous materials include graphitizing carbon and non-graphitizing carbon represented by glassy carbon, which has a structure close to the amorphous structure.

Examples of graphitizing carbon include carbon materials made from tar pitch which is obtained from petroleum or coal. Specific examples include coke, mesocarbon microbeads (MCMB), mesophase pitch-based carbon fiber, and pyrolytic vapor-grown carbon fiber.

Examples of non-graphitizing carbon include sintered phenolic resin, polyacrylonitrile-based carbon fiber, pseudoisotropic carbon, sintered furfuryl alcohol resin (PFA), and hard carbon.

Examples of graphitic materials include natural graphite and artificial graphite.

Examples of artificial graphite include artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

The metal-based negative electrode active material refers to an active material that contains metal, the structure of which usually contains an element to which lithium can be intercalated, and that exhibits, when lithium is intercalated, a theoretical electric capacity of 500 mAh/g or higher per unit mass. Examples of metal-based negative electrode active materials include lithium metals; elementary metals that can be used to form lithium alloys (e.g., Ag, Al, Ba, Bi, Cu, Ga, Ge, In, Ni, P, Pb, Sb, Si, Sn, Sr, Zn, and Ti) and alloys of the foregoing; and oxides, sulfides, nitrides, silicides, carbides, and phosphides of the foregoing. Preferred metal-based negative electrode active materials are active materials containing silicon (silicon-based negative electrode active materials). With the use of the silicon-based negative electrode active material, the capacity of a lithium ion secondary battery can be increased.

Examples of silicon-based negative electrode active materials include silicon (Si), silicon-containing alloys, SiO, $SiO_x$, and composite materials of conductive carbon and Si-containing materials obtained by coating or combining Si-containing materials with conductive carbon. These silicon-based negative electrode active materials may be used alone or in combination.

The blending amount or particle size of the negative electrode active material used herein may be, but not limited to, the same amount or particle size as the negative electrode active material conventionally used.

<Binder Composition>

As a binder composition, the binder composition for electrochemical device electrode of the present disclosure which comprises the copolymer described above is used.

The proportion of the binder composition in the slurry composition for electrochemical device electrode is preferably such that the amount of the copolymer is 0.3 parts by mass or more per 100 parts by mass of the electrode active material, more preferably 1.0 part by mass or more, but preferably 5.0 parts by mass or less, and more preferably 4.0 parts by mass or less. When the binder composition is contained in the slurry composition such that the copolymer is contained in an amount that falls within the range described above, it is possible to increase peel strength of the electrode. In addition, it is possible to suppress cell bulging after repeated cycles of charge and discharge while further improving high-voltage cycle characteristics of an electrochemical device.

<Conductive Material>

The conductive material ensures electrical contact between positive electrode active materials. Examples of conductive materials include conductive carbon materials such as carbon black (e.g., acetylene black, Ketjen Black®, furnace black), single- or multi-walled carbon nanotubes (multi-walled carbon nanotubes include cup-stacked carbon nanotubes), carbon nanohorns, vapor grown carbon fibers, milled carbon fibers obtained by firing polymer fibers followed by milling, single- or multi-walled graphene, and carbon nonwoven sheets obtained by firing nonwoven fabric formed of polymer fiber; and fibers or foils of various metals.

These conductive materials may be used alone or in combination.

The proportion the conductive material in the slurry composition for electrochemical device electrode is preferably 0.1 parts by mass or more per 100 parts by mass of the electrode active material, more preferably 0.5 parts by mass or more, and even more preferably 1.0 part by mass or more, but preferably 5.0 parts by mass or less, and more preferably 4.0 parts by mass or less. When the amount of the conductive material falls within the range described above, it is possible to ensure sufficient electrical contact between electrode active materials to allow an electrochemical device to exhibit superior characteristics (e.g., output characteristics).

<Other Components>

Other components which may be blended in the slurry composition are not particularly limited and examples include components similar to those which may be blended in the binder composition described above. Further, other components may be used alone or in combination at any ratio.

<Slurry Composition>

The slurry composition described above can be prepared by mixing the components described above. Specifically, a mixer such as a ball mill, a sand mill, a bead mill, a pigment disperser, a grinding machine, an ultrasonic disperser, a homogenizer, a planetary mixer, or FILMIX can be used to mix the components described above with an optional solvent to prepare the slurry composition. Optional solvents added when preparing the slurry composition can be the same as those described above for the binder composition.

(Electrochemical Device Electrode)

The electrochemical device electrode of the present disclosure includes, for example on a current collector, an electrode mixed material layer formed using the slurry composition for electrochemical device electrode described above. Specifically, the electrode mixed material layer is usually composed of dried material of the slurry composition for electrochemical device electrode described above, and the electrode mixed material layer comprises at least an electrode active material and the copolymer described above, and optionally, a conductive material and other components. Each component contained in the electrode mixed material layer derives from the slurry composition from which it is made, and a preferred abundance ratio of each component is the same as that in the slurry composition.

In the electrochemical device electrode of the present disclosure, the electrode mixed material layer is formed using the slurry composition for electrochemical device electrode described above, so that the electrode active material is well covered by the copolymer in the electrode mixed material layer and an electrode that comprises this electrode mixed material layer has superior peel strength. Accordingly, the electrochemical device electrode of the present disclosure allows an electrochemical device to exhibit superior high-voltage cycle characteristics.

<Manufacture of Electrochemical Device Electrode>

The electrode mixed material layer of the electrochemical device electrode of the present disclosure can be formed for example by applying the slurry composition described above onto a current collector (coating step) and drying the slurry composition applied onto the current collector to form an electrode mixed material layer on the current collector (drying step).

[Coating Step]

Any of the coating methods known in the art can be used to apply the slurry composition onto a current collector. Specifically, usable coating methods include doctor blade coating, dipping coating, reverse roll coating, direct roll coating, gravure coating, extrusion coating, and brush coating. Upon coating, the slurry composition may be applied on only one side or both sides of a current collector. The thickness of the slurry film on the current collector after coating and before drying can be appropriately set according to the thickness of the electrode mixed material layer obtained by drying.

The current collector to be coated with the slurry composition is made of material having electrical conductivity and electrochemical durability. Specifically, the current collector may be made for example of iron, copper, aluminum, nickel, stainless steel, titanium, tantalum, gold, or platinum. These materials may be used alone or in combination at any ratio.

[Drying Step]

Any of the drying methods known in the art can be used to dry the slurry composition on the current collector. Examples of drying methods include drying by warm, hot or low-humidity air, vacuum drying, and drying by irradiation with infrared rays or electron beams. By drying the slurry composition on the current collector with such drying methods, an electrode mixed material layer is formed on the current collector, thereby providing an electrochemical device electrode which comprises a current collector and an electrode mixed material layer.

After the drying step, the electrode mixed material layer may be subjected to pressing treatment using, for example, a mold press or a roll press. Pressing treatment can increase the peel strength of the electrode. Further, by heating the electrode mixed material layer at a temperature higher than the glass transition temperature of the copolymer during the pressure treatment, the peel strength of the electrode can be further improved while further increasing the density of the electrode mixed material layer. When the electrode mixed material layer comprises a curable polymer, it is preferred to cure the polymer after forming the electrode mixed material layer.

(Electrochemical Device) The electrochemical device of the present disclosure is not particularly limited and it is a lithium ion secondary battery or an electric double-layer capacitor, preferably a lithium ion secondary battery. The electrochemical device of the present disclosure comprises the electrochemical device electrode of the present disclosure. Such an electrochemical device is excellent in such characteristics as high-voltage cycle characteristics.

The following describes a case where the electrochemical device is a lithium ion secondary battery by way of example, but the present disclosure is not limited to this particular example. A lithium ion secondary battery as the electrochemical device of the present disclosure usually comprises electrodes (positive and negative electrodes), an electrolyte solution and a separator, wherein the electrochemical device electrode of the present disclosure is used for at least one of the positive and negative electrodes.

<Electrode>

Electrodes other than the electrochemical device electrode described above which may be used in a lithium ion secondary battery as the electrochemical device of the present disclosure can be any electrode known in the art. Specifically, as an electrode other than the electrochemical device electrode described above, it is possible to use an electrode obtained by forming an electrode mixed material layer on a current collector by known manufacturing methods.

<Electrolyte Solution>

The electrolyte solution is normally an organic electrolyte solution obtained by dissolving a supporting electrolyte in an organic solvent. Supporting electrolytes for lithium ion secondary batteries are lithium salts, for example. Examples of lithium salts include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Preferred are $LiPF_6$, $LiClO_4$ and $CF_3SO_3Li$ as they readily dissolve in solvents and exhibit a high degree of dissociation, with $LiPF_6$ being particularly preferred. These electrolytes may be used alone or in combination at any ratio. Normally, the lithium ion conductivity tends to increase as a supporting electrolyte having a higher degree of dissociation is used. Thus, the lithium ion conductivity can be adjusted by using different types of supporting electrolyte.

Any organic solvent which can dissolve the supporting electrolyte can be used for the electrolyte solution. Examples of suitable organic solvents include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Alternatively, a mixed liquid of two or more of them may be used. Preferred are carbonates for their high permittivity and a wide stable potential region.

The concentration of the electrolyte in the electrolyte solution can be adjusted as appropriate. Further, any additive known in the art can be added to the electrolyte solution.

<Separator>

Any separator can be used and those described in JP2012204303A can be used, for example. Preferred is a microporous membrane made of polyolefinic (e.g., polyethylene, polypropylene, polybutene, or polyvinyl chloride) resin because such a membrane can reduce the total thickness of the separator, whereby the ratio of the electrode active material in the lithium ion secondary battery can be increased to increase the capacity per volume of the device.

<Method of Manufacturing Lithium Ion Secondary Battery>

The lithium ion secondary battery according to the present disclosure can be produced for example stacking a positive electrode and a negative electrode with a separator provided therebetween, rolling or folding the resulting laminate as necessary in accordance with the battery shape, placing it in a battery container, filling the battery container with an electrolyte solution, and sealing the container. In order to prevent pressure-increase inside the lithium ion secondary battery and occurrence of overcharging or overdischarging, an overcurrent preventing device such as a fuse or a PTC device; an expanded metal; or a lead plate may be provided as necessary. The secondary battery may have any shape, such as coin, button, sheet, cylindrical, square, or flattened shape.

EXAMPLES

The following provides a more specific description of the present disclosure based on Examples, which however shall not be construed as limiting the scope of the present disclosure. In the following description, "%" and "parts" used in expressing quantities are by mass, unless otherwise specified.

Moreover, in the case of a polymer that is produced through copolymerization of two or more types of monomers, the proportion constituted by a structural unit formed through polymerization of a given monomer in the polymer is normally, unless otherwise specified, the same as the ratio (charging ratio) of the given monomer of all the monomers used for polymerization for forming the polymer.

In Examples and Comparative Examples, the peel strength of a positive electrode and high-voltage cycle characteristics and bulging resistance of a lithium ion secondary battery were evaluated by the methods described below.

<Peel Strength>

As a current collector, an aluminum foil having a thickness of 15 μm was prepared. The slurry composition for positive electrode as prepared below was applied on one side of the aluminum foil so that the coating amount after drying was 20 mg/cm². The coating film on the aluminum foil was dried at 60° C. for 20 minutes and then at 120° C. for 20 minutes, and heated at 120° C. for 2 hours to afford a positive electrode web. This positive electrode web was rolled with a roll press to prepare a sheet-like positive electrode having a positive electrode mixed material layer with a density of 3.7 g/cm$^3$ formed on the current collector.

The sheet-like positive electrode prepared was cut into a rectangular shape (1.0 cm×10 cm) to prepare a test specimen (positive electrode for evaluation). The test specimen was affixed to a test stage with the positive electrode mixed material layer side facing up. An adhesive cellophane tape (specified in JIS Z1522) was then attached to the surface of the test specimen on the positive electrode mixed material side. The stress at the time when one end of the tape was peeled off at an angle of 180° (toward the other end) at a rate of 50 mm/min was measured. The measurement was 10 times in total and an average of 10 measurements was recorded as peel strength (N/m), which was evaluated based on the criteria given below, where higher peel strength indicates better adhesion strength between the positive electrode mixed material layer and the current collector.

A: Peel strength is 90 N/m or more
B: Peel strength is 70 N/m or more and less than 90 N/m
C: Peel strength is 50 N/m or more and less than 70 N/m
D: Peel strength is 30 N/m or more and less than 50 N/m
E: Peel strength is less than 30 N/m <High-Voltage Cycle Characteristics>

For the lithium ion secondary battery manufactured below, an operation consisting of constant voltage/constant current charging at 4.4V and 1 C and constant current discharging at 3V and 1 C was repeated 100 times (100 cycles) in an environment of 45° C. The ratio of the discharge capacity at the end of the 100th cycle to the discharge capacity at the end of the first cycle was recorded as % capacity maintenance (={(discharge capacity at the end of the 100th cycle)/(discharge capacity at the end of the first cycle)}×100) and evaluated based on the criteria given below, where higher % capacity maintenance indicates better high-voltage cycle characteristics.

A: % Capacity maintenance is 90% or more
B: % Capacity maintenance is 85% or more and less than 90%
C: % Capacity maintenance is 80% or more and less than 85%
D: % Capacity maintenance is 75% or more and less than 80%
E: % Capacity maintenance is less than 75%

<Bulging Resistance>

For the lithium ion secondary battery manufactured below, an operation consisting of constant voltage/constant current charging at 4.4V and 1 C and constant current discharging at 3V and 1 C was conducted once in an environment of 45° C. The lithium ion secondary battery was then immersed in liquid paraffin and its volume V0 was measured. After the measurement of volume V0, the lithium ion secondary battery was taken out from the liquid paraffin and the above charging and discharging operation was repeated in an environment of 45° C. After 400 cycles, the lithium ion secondary battery was again immersed in liquid paraffin and its volume V1 was measured. % Volume change ΔV (%) (={(V1−V0)/V0}×100) of the cell before and after the cycles was then calculated and evaluated based on the criteria given below, where a smaller value of % volume change ΔV indicates better bulging resistance of the cell.

A: % Volume change ΔV is less than 35%
B: % Volume change ΔV is 35% or more and less than 45%
C: % Volume change ΔV is 45% or more and less than 55%
D: % Volume change ΔV is 55% or more Example 1

<Preparation of Copolymer>

Under a nitrogen atmosphere, 85 parts of ion-exchanged water and 0.2 parts of sodium linear alkylbenzene sulfonate were placed in a reactor A fitted with a mechanical stirrer and a condenser and heated to 55° C. with stirring. 0.3 parts of potassium persulfate as 5.0% aqueous solution was then added to reactor A. Subsequently, under a nitrogen atmosphere, 93.3 parts (96.0 mol %) of acrylonitrile as a nitrile group-containing monomer, 1.9 parts (1.2 mol %) of methacrylic acid as an acidic group-containing monomer, 2.3 parts (0.8 mol %) of dimethylaminoethyl methacrylate as a basic group-containing monomer, 4.7 parts (2.0 mol %) of n-butyl acrylate as a monofunctional ethylenically unsaturated carboxylic acid ester monomer, 0.6 parts of sodium linear alkylbenzene sulfonate, 0.035 parts of tertiary dodecyl mercaptan, 0.4 parts of polyoxyethylene lauryl ether, and 80 parts of ion-exchanged water were added into another reactor B fitted with a mechanical stirrer and the mixture was emulsified under stirring to prepare a monomer mixture solution. The monomer mixture solution was added into reactor A at a constant rate over 5 hours while being emulsified under stirring, and reacted until the polymerization conversion rate reached 95% to afford an aqueous dispersion of copolymer. Subsequently, NMP was then added to the aqueous dispersion such that the solid concentration of copolymer was 7%. The aqueous dispersion was subjected to distillation under reduced pressure at 90° C. to remove water and excess NMP to afford a copolymer in NMP solution (binder composition for positive electrode, solid concentration: 8%).

<Preparation of Slurry Composition for Positive Electrode>

95.0 parts of lithium-containing cobalt oxide (LiCoO$_2$) as a positive electrode active material, 3.0 parts of acetylene black (DENKA BLACK, powder product, manufactured by Denka Company Limited) as a conductive material, 2.0 parts (in terms of solid content of copolymer) of the binder composition for positive electrode and an appropriate amount of NMP as an additional solvent were added to a planetary mixer and mixed to prepare a slurry composition for positive electrode. The amount of the additional NMP was adjusted such that the resulting slurry composition for positive electrode had a viscosity at 25° C. of about 4,000 mPa·s as measured at 60 rpm using a B type viscometer ("TVB-10", manufactured by TOKI SANGYO Co. Ltd.).

A test specimen (positive electrode for evaluation) was then prepared using the resultant slurry composition and the peel strength of the positive electrode was evaluated. The results are shown in Table 1.

<Manufacture of Positive Electrode>

As a current collector, an aluminum foil having a thickness of 15 μm was prepared. The slurry composition for positive electrode as prepared above was applied on one side of the aluminum foil so that the coating amount after drying was 20 mg/cm$^2$. The coating film on the aluminum foil was dried at 60° C. for 20 minutes and then at 120° C. for 20 minutes, and heated at 120° C. for 2 hours. The same operation was performed on the other side of the aluminum foil. In this way a positive electrode web was obtained. This positive electrode web was rolled with a roll press to prepare a sheet-like positive electrode having a positive electrode mixed material layer with a density of 3.7 g/cm$^3$ formed on both sides of the current collector. This sheet-like positive electrode was cut into a rectangular shape (4.8 cm×50 cm) to prepare a positive electrode.

<Manufacture of Negative Electrode>

A mixture of 90 parts of spherical artificial graphite (volume-average particle diameter: 12 μm) and 10 parts of $SiO_x$ (volume-average particle size: 10 μm) as a negative electrode active material, 1 part of styrene butadiene rubber (number-average particle diameter: 180 nm, glass transition temperature: 10° C.) as a binder, 1 part of carboxymethyl cellulose as a thickener, and an appropriate amount of water were stirred with a planetary mixer to prepare a slurry composition for negative electrode.

Next, as a current collector, a copper foil having a thickness of 15 μm was prepared. The slurry composition for negative electrode as prepared above was applied on one side of the copper foil so that the coating amount after drying was 12 mg/cm². The coating film on the copper foil was dried at 50° C. for 20 minutes and then at 110° C. for 20 minutes, and heated at 150° C. for 2 hours. The same operation was performed on the other side of the copper foil. In this way a negative electrode web was obtained. This negative electrode web was rolled with a roll press to prepare a sheet-like negative electrode having a negative electrode mixed material layer with a density of 1.8 g/cm³ formed on both sides of the current collector. This sheet-like negative electrode was cut into a rectangular shape (5.0 cm×52 cm) to prepare a negative electrode.

<Manufacture of Lithium Ion Secondary Battery>

With a separator (microporous film made of polypropylene) having a thickness of 20 μm placed between the positive and negative electrodes, the positive and negative electrodes manufactured above were spirally wound using a core having a diameter of 20 mm to afford a spirally wound roll. The obtained roll was compressed from one direction at a rate of 10 mm/sec until the thickness reached 4.5 mm. The roll after compression had an elliptical shape in plan view, with the ratio of major axis to minor axis (major axis/minor axis) being 7.7.

Electrolyte solution (1.0M $LiPF_6$ solution (solvent is a 1:2 (mass) mixed solution of fluoroethylene carbonate (as an additive) and dimethyl carbonate, containing 2% by mass of vinylene carbonate as an additional additive)) was prepared.

The compressed roll was accommodated in an aluminum laminate case together with 3.2 g of the electrolyte solution. After connecting a nickel lead wire to a predetermined portion of the negative electrode and an aluminum lead wire to a predetermined portion of the positive electrode, the opening of the case was sealed by heating to afford a lithium ion secondary battery. The lithium ion secondary battery was in pouch form having a width of 35 mm, a height of 48 mm, and a thickness of 5 mm, with the nominal capacity of the battery being 720 mAh.

The lithium ion secondary battery thus manufactured was evaluated for high-voltage cycle characteristics and bulging resistance. The results are shown in Table 1.

Examples 2 to 12

NMP solutions of copolymer (binder compositions for positive electrode), slurry compositions for positive electrode, positive electrodes, negative electrodes, and lithium ion secondary batteries were manufactured as in Example 1 except that the monomer compositions shown in Table 1 were used for preparing the copolymers. Various evaluations were made as in Example 1. The results are shown in Table 1.

Comparative Examples 1 to 5

NMP solutions of copolymer (binder compositions for positive electrode), slurry compositions for positive electrode, positive electrodes, negative electrodes, and lithium ion secondary batteries were manufactured as in Example 1 except that the monomer compositions shown in Table 1 were used for preparing the copolymers. Various evaluations were made as in Example 1. The results are shown in Table 1.

Comparative Example 6

To a NMP solution of copolymer prepared as in Comparative Example 1 was added 2.35 parts of triethylamine (basic compound) per 100 parts (in terms of solid content) of the copolymer and the mixture was thoroughly stirred to prepare a binder composition for positive electrode. In the binder composition, the molar ratio of triethylamine to the acidic group-containing monomer unit (methacrylic acid unit) contained in the copolymer was 1.0.

A slurry composition for positive electrode, a positive electrode, a negative electrode, and a lithium ion secondary battery were manufactured as in Comparative Example 1 except that the binder composition for positive electrode as obtained above was used for preparing the slurry composition for positive electrode. Various evaluations were made as in Example 1. The results are shown in Table 1.

In Table 1 below,

"AN" stands for acrylonitrile unit,
"MAA" stands for methacrylic acid unit,
"NaSS" stands for sodium styrene sulfonate unit,
"PM" stands for 2-methacryloyloxyethyl phosphate unit,
"DMMA" stands for dimethylaminoethyl methacrylate unit,
"DEMA" stands for diethylaminoethyl methacrylate unit,
"AAm" stands for acrylamide unit,
"BA" stands for n-butyl acrylate unit,
"EA" stands for an ethyl acrylate unit,
"TEA" stands for triethylamine,
"LCO" stands for lithium-containing cobalt oxide ($LiCoO_2$), and
"AcB" stands for acetylene black.

TABLE 1

| | | | | | | | Ex. 1 | Ex. 2 | Ex. 3 | Ex. 4 |
|---|---|---|---|---|---|---|---|---|---|---|
| Slurry composition | Binder composition | Copolymer | Composition | Nitrile group-containing monomer unit | Type | | AN | AN | AN | AN |
| | | | | | Proportion [mol %] | | 96.0 | 91.0 | 81.0 | 80.0 |
| | | | | Acidic group-containing monomer unit | Type | | MAA | MAA | MAA | MAA |
| | | | | | Acidic group | | Carboxylic acid group | Carboxylic acid group | Carboxylic acid group | Carboxylic acid group |
| | | | | | Proportion [mol %] | | 1.2 | 5.0 | 5.0 | 3.0 |

TABLE 1-continued

|  |  |  |  |  |  |  | | | | |
|---|---|---|---|---|---|---|---|---|---|---|
|  |  |  |  | Basic group-containing monomer unit | Type | DMMA | DMMA | DEMA | DMMA |
|  |  |  |  |  | Basic group | Amino group | Amino group | Amino group | Amino group |
|  |  |  |  |  | Proportion [mol %] | 0.8 | 2.0 | 4.0 | 2.0 |
|  |  |  |  | Monofunctional ethylenically unsaturated carboxylic acid ester monomer unit | Type | BA | BA | BA | BA |
|  |  |  |  |  | Proportion [mol %] | 2.0 | 2.0 | 10.0 | 15.0 |
|  |  |  |  | Acidic group-containing monomer unit + Basic group-containing monomer unit | Total Proportion [mol %] | 2.0 | 7.0 | 9.0 | 5.0 |
|  |  |  |  | Basic group-containing monomer unit/Acidic group-containing monomer unit | Molar ratio [—] | 0.67 | 0.4 | 0.8 | 0.67 |
|  |  |  |  | Blending amount [parts by mass] |  | 2.0 | 2.0 | 2.0 | 2.0 |
|  |  | Basic compound |  | Type |  | — | — | — | — |
|  |  |  |  | Molar ratio with respect to acidic group-containing monomer unit in copolymer [—] |  | — | — | — | — |
|  | Positive electrode active material |  |  | Type |  | LCO | LCO | LCO | LCO |
|  |  |  |  | Blending amount [parts by mass] |  | 95.0 | 95.0 | 95.0 | 95.0 |
|  | Conductive Material |  |  | Type |  | AcB | AcB | AcB | AcB |
|  |  |  |  | Blending amount [parts by mass] |  | 3.0 | 3.0 | 3.0 | 3.0 |
| Evaluations |  |  |  | Peel strength |  | A | A | A | A |
|  |  |  |  | High-voltage cycle characteristics |  | A | B | C | C |
|  |  |  |  | Bulging resistance |  | A | A | B | B |

|  |  |  |  |  |  |  | Ex. 5 | Ex. 6 | Ex. 7 | Ex. 8 |
|---|---|---|---|---|---|---|---|---|---|---|
| Slurry composition | Binder composition | Copolymer | Composition | Nitrile group-containing monomer unit | Type | | AN | AN | AN | AN |
|  |  |  |  |  | Proportion [mol %] | | 96.0 | 96.0 | 96.0 | 94.8 |
|  |  |  |  | Acidic group-containing monomer unit | Type | | MAA | NaSS | PM | MAA |
|  |  |  |  |  | Acidic group | | Carboxylic acid group | Sulfonate group | Phosphate group | Carboxylic acid group |
|  |  |  |  |  | Proportion [mol %] | | 1.2 | 1.2 | 1.2 | 1.2 |
|  |  |  |  | Basic group-containing monomer unit | Type | | AAm | DMMA | DMMA | DEMA |
|  |  |  |  |  | Basic group | | Amide group | Amino group | Amino group | Amino group |
|  |  |  |  |  | Proportion [mol %] | | 0.8 | 0.8 | 0.8 | 2.0 |
|  |  |  |  | Monofunctional ethylenically unsaturated carboxylic acid ester monomer unit | Type | | BA | BA | BA | BA |
|  |  |  |  |  | Proportion [mol %] | | 2.0 | 2.0 | 2.0 | 2.0 |
|  |  |  |  | Acidic group-containing monomer unit + Basic group-containing monomer unit | Total Proportion [mol %] | | 2.0 | 2.0 | 2.0 | 3.2 |
|  |  |  |  | Basic group-containing monomer unit/Acidic group-containing monomer unit | Molar ratio [—] | | 0.67 | 0.67 | 0.67 | 1.67 |
|  |  |  |  | Blending amount [parts by mass] |  | | 2.0 | 2.0 | 2.0 | 2.0 |
|  |  | Basic compound |  | Type |  | | — | — | — | — |
|  |  |  |  | Molar ratio with respect to acidic group-containing monomer unit in copolymer [—] |  | | — | — | — | — |
|  | Positive electrode active material |  |  | Type |  | | LCO | LCO | LCO | LCO |
|  |  |  |  | Blending amount [parts by mass] |  | | 95.0 | 95.0 | 95.0 | 95.0 |
|  | Conductive Material |  |  | Type |  | | AcB | AcB | AcB | AcB |
|  |  |  |  | Blending amount [parts by mass] |  | | 3.0 | 3.0 | 3.0 | 3.0 |
| Evaluations |  |  |  | Peel strength |  | | A | B | B | B |
|  |  |  |  | High-voltage cycle characteristics |  | | A | A | A | B |
|  |  |  |  | Bulging resistance |  | | A | A | A | B |

|  |  |  |  |  |  |  | Ex. 9 | Ex. 10 | Ex. 11 | Ex. 12 |
|---|---|---|---|---|---|---|---|---|---|---|
| Slurry composition | Binder composition | Copolymer | Composition | Nitrile group-containing monomer unit | Type | | AN | AN | AN | AN |
|  |  |  |  |  | Proportion [mol %] | | 96.3 | 91.0 | 97.9 | 70.0 |

TABLE 1-continued

|  |  |  |  |  |  |  | | | | |
|---|---|---|---|---|---|---|---|---|---|---|
| Slurry composition | Binder composition | Copolymer | Composition | Acidic group-containing monomer unit | Type | | MAA Carboxylic acid group | MAA Carboxylic acid group | MAA Carboxylic acid group | MAA Carboxylic acid group |
| | | | | | Acidic group | | | | | |
| | | | | | Proportion [mol %] | | 1.5 | 5.0 | 1.2 | 3.0 |
| | | | | Basic group-containing monomer unit | Type | | AAm | DMMA | DMMA | DMMA |
| | | | | | Basic group | | Amide group | Amino group | Amino group | Amino group |
| | | | | | Proportion [mol %] | | 0.2 | 2.0 | 0.8 | 2.0 |
| | | | | Monofunctional ethylenically unsaturated carboxylic acid ester monomer unit | Type | | BA | EA | BA | BA |
| | | | | | Proportion [mol %] | | 2.0 | 2.0 | 0.1 | 25.0 |
| | | | | Acidic group-containing monomer unit + Basic group-containing monomer unit | Total Proportion [mol %] | | 1.7 | 7.0 | 2.0 | 5.0 |
| | | | | Basic group-containing monomer unit/Acidic group-containing monomer unit | Molar ratio [—] | | 0.13 | 0.4 | 0.67 | 0.67 |
| | | | Blending amount [parts by mass] | | | | 2.0 | 2.0 | 2.0 | 2.0 |
| | | Basic compound | Type | | | | — | — | — | — |
| | | | Molar ratio with respect to acidic group-containing monomer unit in copolymer [—] | | | | — | — | — | — |
| | Positive electrode active material | | Type | | | | LCO | LCO | LCO | LCO |
| | | | Blending amount [parts by mass] | | | | 95.0 | 95.0 | 95.0 | 95.0 |
| | Conductive Material | | Type | | | | AcB | AcB | AcB | AcB |
| | | | Blending amount [parts by mass] | | | | 3.0 | 3.0 | 3.0 | 3.0 |
| Evaluations | | | Peel strength | | | | B | B | B | A |
| | | | High-voltage cycle characteristics | | | | B | B | A | C |
| | | | Bulging resistance | | | | B | A | A | D |

|  |  |  |  |  |  |  | Comp. Ex. 1 | Comp. Ex. 2 | Comp. Ex. 3 | Comp. Ex. 4 |
|---|---|---|---|---|---|---|---|---|---|---|
| Slurry composition | Binder composition | Copolymer | Composition | Nitrile group-containing monomer unit | Type | | AN | AN | AN | AN |
| | | | | | Proportion [mol %] | | 95.0 | 95.0 | 83.5 | 96.0 |
| | | | | Acidic group-containing monomer unit | Type | | MAA | — | MAA | MAA |
| | | | | | Acidic group | | Carboxylic acid group | — | Carboxylic acid group | Carboxylic acid group |
| | | | | | Proportion [mol %] | | 1.5 | — | 10.0 | 0.3 |
| | | | | Basic group-containing monomer unit | Type | | — | DMMA | DMMA | DMMA |
| | | | | | Basic group | | — | Amino group | Amino group | Amino group |
| | | | | | Proportion [mol %] | | — | 1.5 | 3.0 | 0.2 |
| | | | | Monofunctional ethylenically unsaturated carboxylic acid ester monomer unit | Type | | BA | BA | BA | BA |
| | | | | | Proportion [mol %] | | 3.5 | 3.5 | 3.5 | 3.5 |
| | | | | Acidic group-containing monomer unit + Basic group-containing monomer unit | Total Proportion [mol %] | | 1.5 | 1.5 | 13.0 | 0.5 |
| | | | | Basic group-containing monomer unit/Acidic group-containing monomer unit | Molar ratio [—] | | — | — | 0.3 | 0.67 |
| | | | Blending amount [parts by mass] | | | | 2.0 | 2.0 | 2.0 | 2.0 |
| | | Basic compound | Type | | | | — | — | — | — |
| | | | Molar ratio with respect to acidic group-containing monomer unit in copolymer [—] | | | | — | — | — | — |
| | Positive electrode active material | | Type | | | | LCO | LCO | LCO | LCO |
| | | | Blending amount [parts by mass] | | | | 95.0 | 95.0 | 95.0 | 95.0 |
| | Conductive Material | | Type | | | | AcB | AcB | AcB | AcB |
| | | | Blending amount [parts by mass] | | | | 3.0 | 3.0 | 3.0 | 3.0 |
| Evaluations | | | Peel strength | | | | C | D | B | E |
| | | | High-voltage cycle characteristics | | | | D | D | D | E |
| | | | Bulging resistance | | | | B | C | C | C |

TABLE 1-continued

| | | | | | | | Comp. Ex. 5 | Comp. Ex. 6 |
|---|---|---|---|---|---|---|---|---|
| Slurry composition | Binder composition | Copolymer | Composition | Nitrile group-containing monomer unit | | Type | AN | AN |
| | | | | | | Proportion [mol %] | 60.0 | 95.0 |
| | | | | Acidic group-containing monomer unit | | Type | MAA | MAA |
| | | | | | | Acidic group | Carboxylic acid group | Carboxylic acid group |
| | | | | | | Proportion [mol %] | 1.2 | 1.5 |
| | | | | Basic group-containing monomer unit | | Type | DMMA | — |
| | | | | | | Basic group | Amino group | — |
| | | | | | | Proportion [mol %] | 0.8 | — |
| | | | | Monofunctional ethylenically unsaturated carboxylic acid ester monomer unit | | Type | BA | BA |
| | | | | | | Proportion [mol %] | 38.0 | 3.5 |
| | | | | Acidic group-containing monomer unit + Basic group-containing monomer unit | | Total Proportion [mol %] | 2.0 | 1.5 |
| | | | | Basic group-containing monomer unit/Acidic group-containing monomer unit | | Molar ratio [—] | 0.67 | — |
| | | | | | | Blending amount [parts by mass] | 2.0 | 2.0 |
| | | | Basic compound | | | Type | — | TEA |
| | | | | | | Molar ratio with respect to acidic group-containing monomer unit in copolymer [—] | — | 1.0 |
| | Positive electrode active material | | | | | Type | LCO | LCO |
| | | | | | | Blending amount [parts by mass] | 95.0 | 95.0 |
| | Conductive Material | | | | | Type | AcB | AcB |
| | | | | | | Blending amount [parts by mass] | 3.0 | 3.0 |
| Evaluations | | | | | | Peel strength | B | C |
| | | | | | | High-voltage cycle characteristics | E | D |
| | | | | | | Bulging resistance | D | B |

It can be seen from Table 1 that Examples 1 to 12, which used binder compositions comprising a copolymer which comprises a nitrile group-containing monomer unit, an acidic group-containing monomer unit and a basic group-containing monomer unit wherein the proportion of the nitrile group-containing monomer unit falls within a specific range and the total proportion of the acidic group-containing monomer unit and the basic group-containing monomer unit falls within a specific range, enabled manufacture of a positive electrode having superior peel strength and a lithium ion secondary battery having superior high-voltage cycle characteristics and bulging resistance.

It can also be seen from Table 1 that Comparative Example 1, which used a binder composition comprising a copolymer which does not comprise a basic group-containing monomer unit, undesirably caused reductions in the peel strength of the positive electrode as well as in high-voltage cycle characteristics of the lithium ion secondary battery.

It can also be seen from Table 1 that Comparative Example 2, which used a binder composition comprising a copolymer which does not comprise an acidic group-containing monomer unit, undesirably caused reductions in the peel strength of the positive electrode as well as in high-voltage cycle characteristics and bulging resistance of the lithium ion secondary battery.

It can also be seen from Table 1 that Comparative Example 3, which used a binder composition comprising a copolymer which comprises a high total proportion of an acidic group-containing monomer unit and a basic group-containing monomer unit, undesirably caused reductions in high-voltage cycle characteristics and bulging resistance of the lithium ion secondary battery.

It can also be seen from Table 1 that Comparative Example 4, which used a binder composition comprising a copolymer which comprises a low total proportion of an acidic group-containing monomer unit and a basic group-containing monomer unit, undesirably caused reductions in the peel strength of the positive electrode as well as in high-voltage cycle characteristics and bulging resistance of the lithium ion secondary battery.

It can also be seen from Table 1 that Comparative Example 5, which used a binder composition comprising a copolymer which comprises a low proportion of a nitrile group-containing monomer unit, undesirably caused reductions in high-voltage cycle characteristics and bulging resistance of the lithium ion secondary battery.

Finally, it can be seen from Table 1 that Comparative Example 6, which used a binder composition comprising 1) a copolymer which does not comprise a basic group-containing monomer unit and 2) a basic compound, undesirably caused reductions in the peel strength of the positive electrode as well as in high-voltage cycle characteristics and bulging resistance of the lithium ion secondary battery. This would be because no interaction would occur among polymer chains of the copolymer even when a basic compound is used in place of the basic group-containing monomer unit in the copolymer and hence polymer strength is inferior compared to the cases where a copolymer comprising both an acidic group-containing monomer unit and a basic group-containing monomer unit is used.

INDUSTRIAL APPLICABILITY

According to the present disclosure, it is possible to provide a binder composition and a slurry composition for electrochemical device electrode which can be used to form an electrode mixed material layer that allows an electrochemical device to exert superior high-voltage cycle characteristics.

According to the present disclosure, it is also possible to provide an electrochemical device electrode which allows an electrochemical device to exert superior high-voltage cycle characteristics.

According to the present disclosure, it is also possible to provide an electrochemical device having superior high-voltage cycle characteristics.

The invention claimed is:

1. A binder composition for electrochemical device electrode comprising a copolymer,
wherein the copolymer comprises a nitrile group-containing monomer unit, an acidic group-containing monomer unit, a basic group-containing monomer unit and a monofunctional ethylenically unsaturated carboxylic acid ester monomer unit, wherein the proportion of the nitrile group-containing monomer unit in the copolymer is 70.0 mol % or more and 99.0 mol % or less, and wherein the total proportion of the acidic group-containing monomer unit and the basic group-containing monomer unit in the copolymer is 0.8 mol % or more and 10.0 mol % or less,
the basic group-containing monomer unit is at least one of an amino group-containing monomer unit and an amide group-containing monomer unit,
the ratio by mole of the proportion of the basic group-containing monomer unit to the proportion of the acidic group-containing monomer unit in the copolymer is 0.1 or more and 2.0 or less, and
the proportion of the monofunctional ethylenically unsaturated carboxylic acid ester monomer unit in the copolymer is 0.2 mol % or more and 20.0 mol % or less.

2. The binder composition for electrochemical device electrode according to claim 1, wherein the acidic group-containing monomer unit is at least one monomer unit selected from the group consisting of a carboxylic acid group-containing monomer unit, a sulfonate group-containing monomer unit, and a phosphate group-containing monomer unit.

3. A slurry composition for electrochemical device electrode comprising the binder composition for electrochemical device electrode according to claim 1, and an electrode active material.

4. An electrochemical device electrode comprising an electrode mixed material layer formed using the slurry composition for electrochemical device electrode according to claim 3.

5. An electrochemical device comprising the electrochemical device electrode according to claim 4.

* * * * *